AUTOMATIC SELECTOR MECHANISM

Filed June 15, 1945 5 Sheets-Sheet 1

Inventor
ERICH J. UHLIG

By H. S. Grover

Attorney

Nov. 13, 1951 E. J. UHLIG 2,574,603

AUTOMATIC SELECTOR MECHANISM

Filed June 15, 1945 5 Sheets-Sheet 2

Inventor

ERICH J. UHLIG

By H. S. Grover

Attorney

Nov. 13, 1951 E. J. UHLIG 2,574,603

AUTOMATIC SELECTOR MECHANISM

Filed June 15, 1945 5 Sheets-Sheet 3

Inventor

ERICH J. UHLIG

By H. S. Grover

Attorney

Nov. 13, 1951 E. J. UHLIG 2,574,603

AUTOMATIC SELECTOR MECHANISM

Filed June 15, 1945 5 Sheets-Sheet 4

Inventor
ERICH J. UHLIG

By H. S. Grover

Attorney

AUTOMATIC SELECTOR MECHANISM

INVENTOR.
ERICH J. UHLIG
BY H. G. Grover
ATTORNEY

Patented Nov. 13, 1951 2,574,603

UNITED STATES PATENT OFFICE 2,574,603

AUTOMATIC SELECTOR MECHANISM

Erich J. Uhlig, Haddon Heights, N. J., assignor to Radio Corporation of America, a corporation of Delaware Application June 15, 1945, Serial No. 599,571

19 Claims. (Cl. 192—142)

My present invention relates in general to automatic selector mechanism, and more particularly to such mechanism which is adapted to effect the adjustment of variable elements of radio apparatus, such as transmitters and receivers, to predetermined or prearranged positions.

It is desirable in certain radio installations, as in two-way communication systems for aircraft or on board ship, to effect adjustment of both the receiver and the transmitter, expeditiously and accurately from one predetermined channel frequency to another, sometimes in accordance with a definite time schedule. Each adjustment of such equipment, ordinarily involves the angular positioning of a plurality of rotary tuning condensers or other variable tuning elements, and in some instances a crystal selector switch. The present invention is directed to an automatic selector mechanism for use in radio installations of the type mentioned above.

One of the objects of my invention is to provide an automatic selector mechanism of relatively simple and rugged construction, and of small size and low weight, factors which are important particularly in aircraft installations.

A further object of the invention is to provide positive locking means for the position-determining elements of the selector to thereby withstand accidental change of adjustment of the controlled device that may result from vibration or other cause.

A still further object of the invention is to provide a selector mechanism of such construction that it lends itself very readily to be controlled by a relatively simple electrical control system.

A more specific object of the invention is to provide, in a selector mechanism for automatically adjusting a control shaft to one of a plurality of predetermined angular positions, the combination of a framework in which the control shaft to be adjusted is journaled, a selector disc assembly having individually adjustable discs mounted on said shaft, a multi-position rotatable drum arranged in concentric relation with and spaced from the disc assembly, a plurality of disc stopping means, individually operable in dependence upon the drum position, supported from the framework and disposed within the space between the disc assembly and the drum, a reversible motor, means including a clutch interposed between said motor and control shaft operative upon rotation of the motor in one direction to drive the drum to a selected one of its positions, and means including said clutch operative upon rotation of the motor in the opposite direction to drive the selector disc assembly to a position whereat it is stopped by the then operable disc stopping means.

Another object of the invention is to provide between the motor drive and the selector mechanism a friction clutch of novel construction which maintains a proper desired driving relation therebetween and which does not require any adjustment with use.

To the accomplishment of the foregoing and such other objects and advantages as may hereinafter appear, the invention further consists in the structural combinations hereinafter sought to be defined in the claims and described more in detail in the following specification read in conjunction with the accompanying drawings in which:

Figure 1:
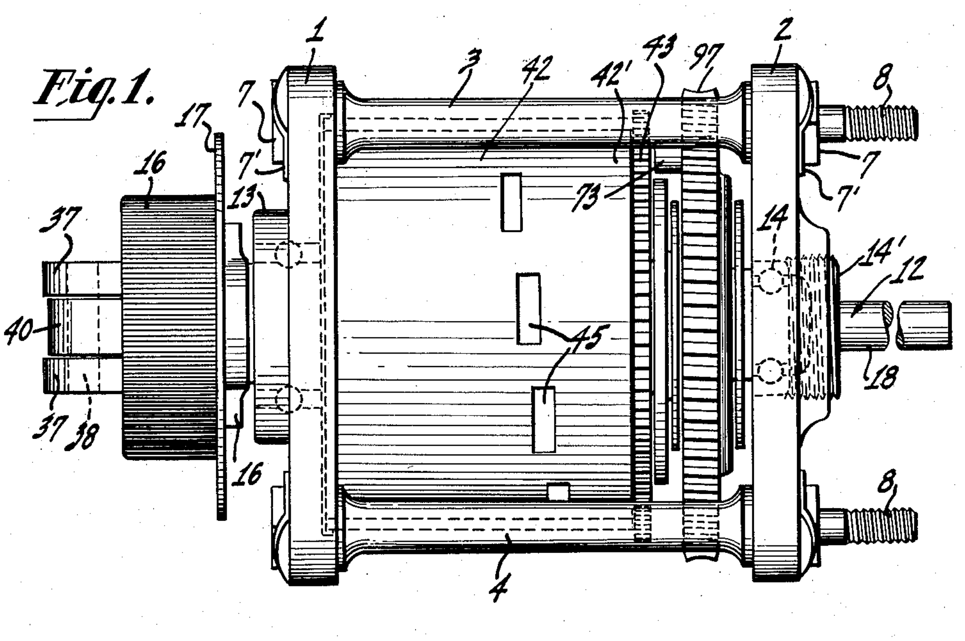
Fig. 1 is a top plan view, on an enlarged scale, of the selector mechanism in accordance with the invention.
Figures 2, 3:
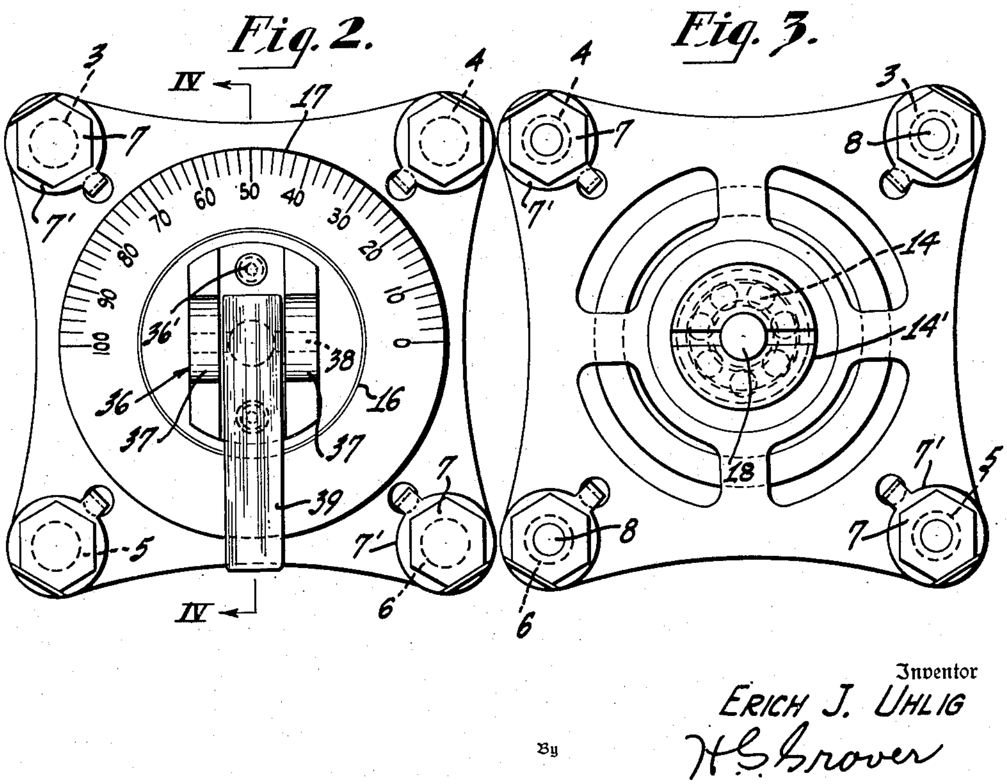
Figs. 2 and 3 are front and rear elevational views, respectively, of the selector mechanism shown in Fig. 1.

Referring now to the drawings, and more particularly to Figs. 1 to 4, the selector mechanism is shown to comprise a frame-work consisting of a front plate 1 and a rear plate 2 which are held in spaced, parallel relation by four cross-rods 3 to 6, one in each corner, the front and rear plates being substantially rectangular in shape, as shown in Figs. 2 and 3, respectively. A bolt 7 and lock-washer 7′ in each corner of the front and rear plates serve to unite the cross-rods and plates together in a rigid framework. In order that the selector unit may be suitably mounted, the bolts at the rear plate are provided with threaded extensions 8 which are adapted to pass through apertures 9 in a supporting member 10, which may be the front panel of a receiver or transmitter, the unit being held in position by a nut 11 on each bolt extension.

Centrally arranged within the framework and extending through the front and rear plates is a control shaft 12 which is journalled in a ball bearing 13 retained within the front plate and in a ball bearing 14 retained within the rear plate. The forwardly extending portion 15 of the shaft is externally threaded at 15′ and is adapted to receive a manual control knob 16. An indicator dial 17 disposed behind knob 16 is clamped thereto by means of a lock-nut 16′ which is screw-threaded on a hub extension 16″ of the knob. Within rear plate 2 is screw-threaded a plug 14′ which serves to retain the ball bearing 14 in position. The rearwardly extending portion 18 of the shaft is adapted to be mechanically coupled in a suitable manner to a device to be adjusted, shown by way of example, as a variable tuning condenser 18′. In the disclosed embodiment of the present invention condenser 18′ is of the type having semi-circular fixed and rotor plates. The rotor, however, being mechanically coupled to the control shaft, is also continuously rotatable, although the condenser is effective through only 180°.

Figure 4:
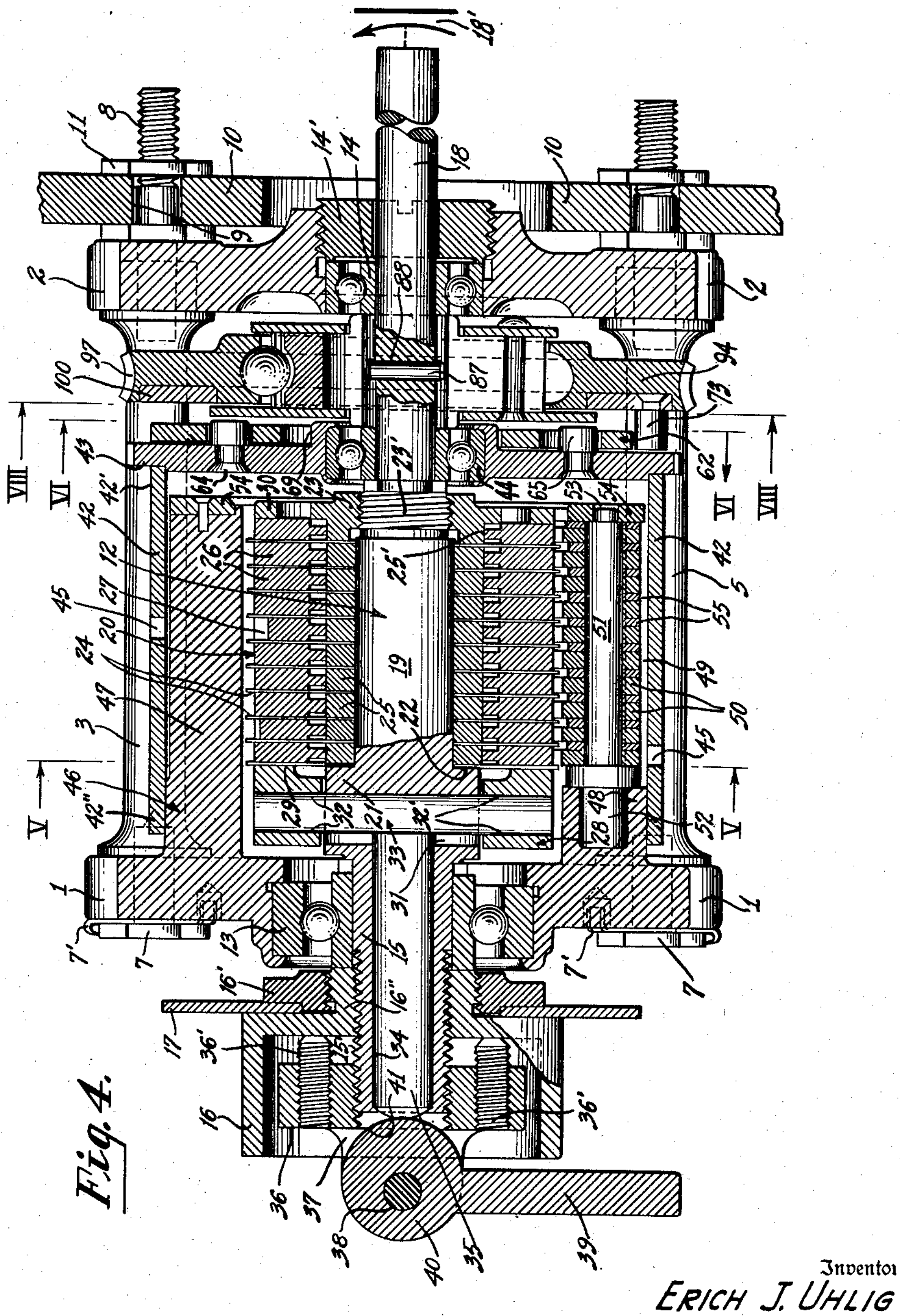
Fig. 4 is a transverse cross-sectional view of the mechanism, taken on the line IV—IV of Fig. 2, looking in the direction of the arrows.

Carried by an intermediate portion 19 of the shaft 12, at the forward end thereof and between the end plates, is a selector-disc assembly shown generally at 20, and the parts associated therewith are shown in cross-section in Fig. 4 to which reference will now be made. Just behind the front plate 1, the intermediate portion 19 of the control shaft is provided with a portion 21 of enlarged diameter forming a shoulder 22 with shaft portion 19. Between said shoulder and a nut 23 which is screw-threaded on the shaft at 23′ are disposed alternate spacers 24 and ring bushings 25. The nut 23 when tightened serves to clamp the several ring bushings and spacers against the shoulder 22 so that they rotate with the shaft as a unit. Encircling each of the bushings and disposed between adjacent spacers is a selector disc or ring 26 provided at one point in its periphery with a notch 27, shown more clearly in Fig. 5, there being a total of ten such selector discs in the device herein described. The discs or rings 26 serve as position-determining members for the control shaft and are capable of individual adjustment around the ring bushings 25 in a manner later to be described, in order that the notches 27 may be disposed in various angular positions with respect to the control shaft, the adjusted angular positions of the disc notches corresponding each to one of the predetermined angular adjustments, ten in the present instance, of the device to be adjusted, such as the condenser 18′.

For the purpose of clamping together the several selector discs 26 for rotation with control shaft 12 there is provided a pressure plate 28 slidably mounted on the shaft portion 21 so that by applying pressure to the plate in a rearward direction by means later to be described, the several discs are clamped together at their rims between a rearwardly extending rim portion 29 of the pressure plate and a second plate 30 formed integrally with a nut 23 which is provided with another integral portion 25′ to serve as the bushing for the ring 26 at that end of the selector disc assembly. In order that pressure may be removed from the stack of selector discs to permit of individual angular adjustment thereof, and also for applying pressure to the discs to condition the assembly for normal operation, the shaft portion 21 is provided with a transverse radial slot 31 which passes therethrough from one side to the other and the pressure plate 28 is provided with a pair of radially aligned bores 32, 32′. A pin 33 extends through the slot 31 in shaft portion 21 and its opposite ends are received in the bores 32, 32′ of the pressure plate, a forced-fit being provided between the rod and the bores. The pressure plate is thereby keyed to rotate with the shaft, but by reason of the axial direction of the slot the pressure plate is capable also of axial movement on shaft portion 21.

The front end 15 of the control shaft is provided with a central bore 34 within which there is fitted a push-rod 35 for sliding movement, one end thereof contacting pressure-plate pin 33 and the other end extending slightly beyond shaft end 15. On this end of the shaft, within the hollow of manual control knob 16, there is screw-threaded a lever plate 36 capable of being locked in position by a pair of screws 36′ bearing against the wall of the knob. Plate 36 is provided with a pair of ears 37 between which there is supported a cross-pin 38 and on the latter there is pivoted a cam-lever 39. The pin is off-center with respect to the hub 40 of the lever to provide a cam surface at 41 for effecting the necessary sliding movement for push-rod 35. In Fig. 4, lever 39 is shown in its operative position, with push-rod 35 pushed rearwardly to exert pressure on plate 28 through pin 33. This is the normal operating condition for the disc stack of the selector assembly. However, by rocking lever 39 in the clockwise direction, as viewed in Fig. 4, the high side of the cam is withdrawn from the forward end of the push-rod, and the pressure is removed since the rod is now free to move in a forward direction. In this released position of lever 39 the disc assembly is conditioned for individual adjustment of the several selector discs. The manner in which such adjustment is carried out will be explained later.

In concentric relation with respect to the selector disc assembly 20 and suitably spaced therefrom is a drum 42, to the rear rim portion 42′ of which there is attached in a suitable manner a gear 43 adapted to rotate on the control shaft 12 next adjacent the disc assembly, a ball-bearing 44 retained within gear 43 being provided for that purpose. As shown in Fig. 1, and also in Fig. 5, the drum is provided on its cylindrical surface with slots 45, there being as many slots as there are selector discs. The several slots are radially aligned each with one of the selector discs, and they are also equi-angularly spaced around the circumference of the drum at 36° intervals, in the present case, assuming in effect a spiral formation.

A bearing surface for the front rim portion 42″ of drum 42 is provided by a cylindrical portion 46 formed integral with, or otherwise attached to, the rear side of the front frame plate 1. Through approximately 180° (see Fig. 5), cylindrical portion 46 is provided with an axially-extending portion 47 which is coextensive in an axial direction with the disc assembly 20. The rest of the cylindrical portion 46 extends in an axial direction for only a short distance as shown at 48 (Fig. 4).

Disposed in the annular space 49, provided between the disc assembly 20 and the encircling drum 42, are a plurality of stop-levers 50 which are pivotally mounted on a cross-rod 51 arranged in parallel relation with control shaft 12. Cross-rod 51 at one end is force-fitted into a bore 52 formed in portion 48, its other end being received by an aperture 53 formed in a ring member 54 which is screwed or otherwise attached to the rear edge of extended portion 47. For each selector disc there is a corresponding stop-lever in radial alignment therewith, suitable spacing rings 55 being interposed between adjacent levers.

Each stop-lever 50 (Fig. 5) is provided at one end with a locking portion 56 adapted to interlock with a disc notch 27 of the corresponding selector disc. At the other end the lever is provided with a hooked or tail portion 57 which is adapted to extend through the particular drum slot 45 aligned therewith. At any one of its ten positions of adjustment, to which drum 42 may be actuated by means later to be described, there can be but one slot so positioned that it is capable of receiving the tail portion of the lever aligned therewith. The remaining stop-levers, which are in the inoperative state, will each assume the position shown by the lever designated 50′ in Fig. 5. In that position the stop-levers are confined within the space 49 between the disc assembly and the drum, with their locking portions 56 spaced away from the peripheries of selector discs 26, and with their tail portions 57 in contact with the inner surface of the drum.

Figures 5, 6:
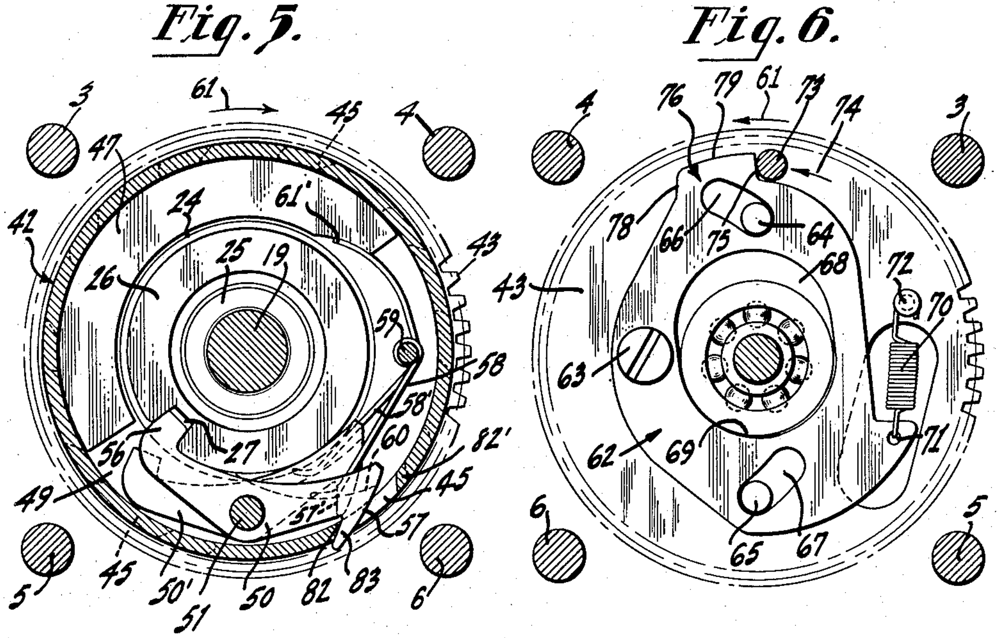
Fig. 5 is a cross-sectional view, taken on the line V—V of Fig. 4, looking in the direction of the arrows, showing a selector disc held in locked position by its associated stop-lever.
Fig. 6 is a cross-sectional view, taken on the line VI—VI of Fig. 4, looking in the direction of the arrows, showing the cooperative relation between the slip cam and the drum during the early part of a cycle of operation when the drum is being driven to a predetermined position.

Each stop-lever has associated with it a wire-spring 58 centrally supported on a cross-rod 59 which, like cross-rod 51 for the stop-levers, is supported between portion 48 and ring member 54. One end of spring 58 is seated in a groove 60 formed in the upper edge of each lever and the other end is anchored on a ledge 61 formed in the semi-circular part 47 as shown in Fig. 5. In the case of a stop-lever in an inoperative position, such as shown for lever 50′, the wire-spring associated therewith is flexed to the position shown for spring 58′. In that position the action of the spring is to urge the heel 57′ of the tail portion against the inner surface of the drum. In the case of a lever in an operative position, such as shown for lever 50, the stored-up energy in the spring is released, rocking the lever in a clockwise direction on cross-rod 51 as a pivot and forcing the tail portion through the drum slot 45 aligned therewith. The extent to which the lever is rocked is determined by the position of the notch 27 of the disc corresponding to the operative lever. With said notch out of registry with locking part 56, the latter will rest on the disc periphery during rotation of the disc assembly and the tail portion 57 will extend only partially through the drum slot. However, upon rotation of the disc to a point where locking part 56 is opposite the disc notch, the tail portion 57 will be forced by action of the spring through the drum slot to a greater extent. At a later point, when a description of a complete cycle of operation is given, it will be explained how a stop-lever is actuated to the locked or home position as shown in Fig. 5 for the lever 50.

Drum 42 is capable of adjustment to any one of ten positions which correspond each to one of the predetermined angular adjustments previously mentioned, and each of said drum positions determines the particular stop-lever which is to be effective at a given time. The drum, in being driven to each of said positions, is capable of continuous rotation in only one direction, which in the disclosed embodiment is in the clockwise direction when viewed from the front of the mechanism. This direction is indicated in Fig. 5 by the arrow designated at 61. The drum actuating means will now be described in connection with Figs. 4, 6 and 7. A slip cam 62 having the configuration shown in Fig. 6 is pivoted at 63 to the rear face of drum gear 43. Riveted to the drum gear is a pair of studs 64, 65 which extend, respectively, into a pair of arcuate slots 66, 67 formed in cam 62, the length of said slots determining the extent to which the slip cam may be moved relatively to the drum gear, for a purpose later to be explained. In order to permit of said relative movement, the central aperture 68 of the cam which is seated on a shoulder or hub 63 of the drum gear is also elongated as shown. The slip cam normally is in the position shown in Fig. 6, being urged to that position by means of a coil spring 70 having one end anchored to the cam at 71 and its other end anchored to a pin 72 carried by the drum gear. Since Fig. 6 is a view looking from the rear, which is opposite to the direction from which Fig. 5 is viewed, the counter-clockwise direction of rotation of drum gear 43 and slip cam 62 shown by the arrow in Fig. 6 corresponds to the clockwise direction of rotation in Fig. 5 of the same elements. The arrow in Fig. 6, therefore, has been designated by the same reference character 61.

For the present it is sufficient to state that the motive power for operating the selector mechanism is derived from an electrical, reversible motor which is coupled, through suitable reduction gearing, to a clutch which in turn drives the slip cam and drum assembly through a lost-motion connection, all to be described more fully hereinafter. At 73, in Fig. 6, is shown a stud which actually is carried by an element of the above-mentioned connection; but for the present, in order to explain the coaction between the slip cam and drum, stud 73 may be considered as being driven first in the direction of arrow 74 in Fig. 6 and then in the reverse direction indicated by arrow 77 in Fig. 7.

Assuming then that the direction of motor operation is such that stud 73 moves in the direction of arrow 74, the drum and slip cam assembly remain stationary until the stud reaches the right-hand edge 75 of cam projection 76. Continued actuation of the stud, however, causes the application of a driving force to the cam at 75, and since studs 64 and 65 on the drum gear are located in their respective arcuate slots 66 and 67, at the lower ends thereof as shown in Fig. 6, the driving force is also applied to the drum gear, and the two will be rotated together in the direction of arrow 61 to a point determined by the electrical control system to be described later. Fig. 6 shows one of the positions to which the drum gear may be actuated in the manner described above. The motor at this point reverses its direction of operation. The action that follows will now be described in connection with Fig. 7.

In the reverse direction of operation of the motor, stud 73 also is rotated in the reverse direction (arrow 77) away from edge 75 of the cam projection 76. During the interval that stud 73 travels from its position shown in Fig. 6 to the dotted line position shown in Fig. 7, the drum gear remains stationary. Upon continued rotation in the direction of arrow 77, the stud 73 engages successively edges 78 and 79 of cam projection 76 and rocks the slip cam 62 about its pivot 63 in the direction of arrow 80 to the solid line position shown, so that slots 66, 67 and 68 assume the positions shown in Fig. 7 with respect to studs 64, 65 and hub 69, respectively. Stud 73 continues to ride on edge 79 in the direction of arrow 77, but before it reaches the right-hand edge 75 of the cam projection, the slip cam 62, through the spring 70, has moved the drum gear 43 and drum 42 in the direction of arrow 81, Fig. 7. Movement of stud 73 continues, however, and when it reaches the right-hand edge 75, the cam 62 is raised by spring 70, and the slip cam and drum gear again assume their normal relative positions with respect to each other, as shown in Fig. 6. The rotation of drum gear 43 in the direction of arrow 81 (Fig. 7), it will be noted, is in a direction opposite to that (arrow 61) in which drum 42 is normally rotated. The extent of this backward movement of the drum, although slight, is sufficient to bring the forward edge 82 of the drum slot 45 forcibly against the inner edge 83 of tail portion 57 (shown in Fig. 5) to lock the operative stop-lever 50, and incidentally its associated selector disc, in a positive manner. This locking feature, it should be understood, is extremely advantageous in installations where excessive vibration is apt to cause the locking part 56 of a stop-lever to become disengaged from the notch 27 of an associated selector disc.

Figure 8:
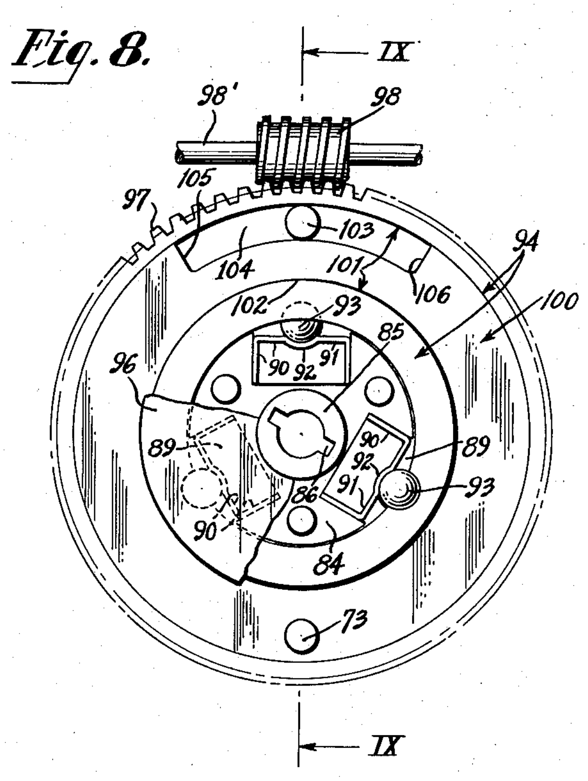
Fig. 8 is a side view of the clutch, looking in the direction of the arrows on line VIII—VIII of Fig. 4, and with the retainer plate partly broken away to show the internal construction of the clutch.
Figure 9:
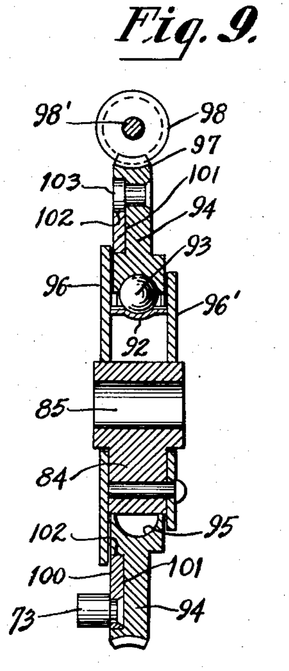
Fig. 9 is a cross-sectional view of the clutch taken on the line IX—IX of Fig. 8, looking in the direction of the arrows.

The clutch and lost-motion connection, mentioned above, which impart the necessary driving action from the motor to the selector mechanism, are disclosed in Figs. 8 and 9. The clutch consists of a hub part 84 having a central aperture 85 provided with diametrically opposed keyways 86, within which there are adapted to extend the opposite ends of a key or pin 87 extending diametrically through a hole 88 in control shaft 12 (see Fig. 4). Since the shaft and clutch part are thus keyed together, the shaft will be rotated (if free to rotate) whenever the clutch part is caused to be rotated; and the clutch part, on the other hand, will be held stationary whenever the shaft is locked in position, that is, when actuated to one of the predetermined selected positions.

Hub part 84 is provided at its periphery with three substantially rectangular cut-outs 89 spaced apart 120°, and within each of said cut-outs there is fitted a U-shaped spring 90, as shown. The body portion 91 of each spring is formed with a depression or well 92 which is adapted to receive a steel ball 93 like that used in ball-bearings. Cooperating with hub part 84 is a second clutch part 94 in the form of an annulus, with the inner peripheral surface, except for a race-way 95 formed therein, in contact with the peripheral surface of part 84 which acts as a bearing for the second clutch part. The race-way is semi-circular in transverse cross-section, Fig. 9, and the steel balls fit snugly therein. Retaining plates 96 and 96' are riveted to the inner hub part, one on each side thereof, and are adapted to retain springs 90 in position. The outer periphery of clutch part 94 is provided with gear teeth 97 which are adapted to mesh with a worm-gear 98 keyed to a shaft 98' adapted to be driven from a reversible motor 99 (Fig. 10) through suitable gearing represented by block 99'.

The lost-motion connection mentioned above is constituted by a ring member 100 fitted within an annular channel or groove 101 formed on the inner face of the outer clutch part, said ring resting on a shoulder 102 which acts as a bearing surface. A pin 103 is riveted to clutch part 94 at one point adjacent its periphery and extends into an open arcuate slot 104 of suitable length formed in the ring member. At a point diametrically opposite the slot, the ring member has riveted to it the stud 73, previously referred to (see Figs. 6 and 7), for driving the multi-position drum 42. In operation, upon rotation of the outer clutch part in either direction, depending upon the portion of the cycle during which the motor is then operating, motion will not be transmitted to ring member 100 until pin 103 first reaches and then coacts with one or the other of the sides 105, 106 at opposite ends of the ring slot 104. The purpose of this lost-motion connection will be explained hereinafter in connection with the operation of the system as a whole.

Figure 10:
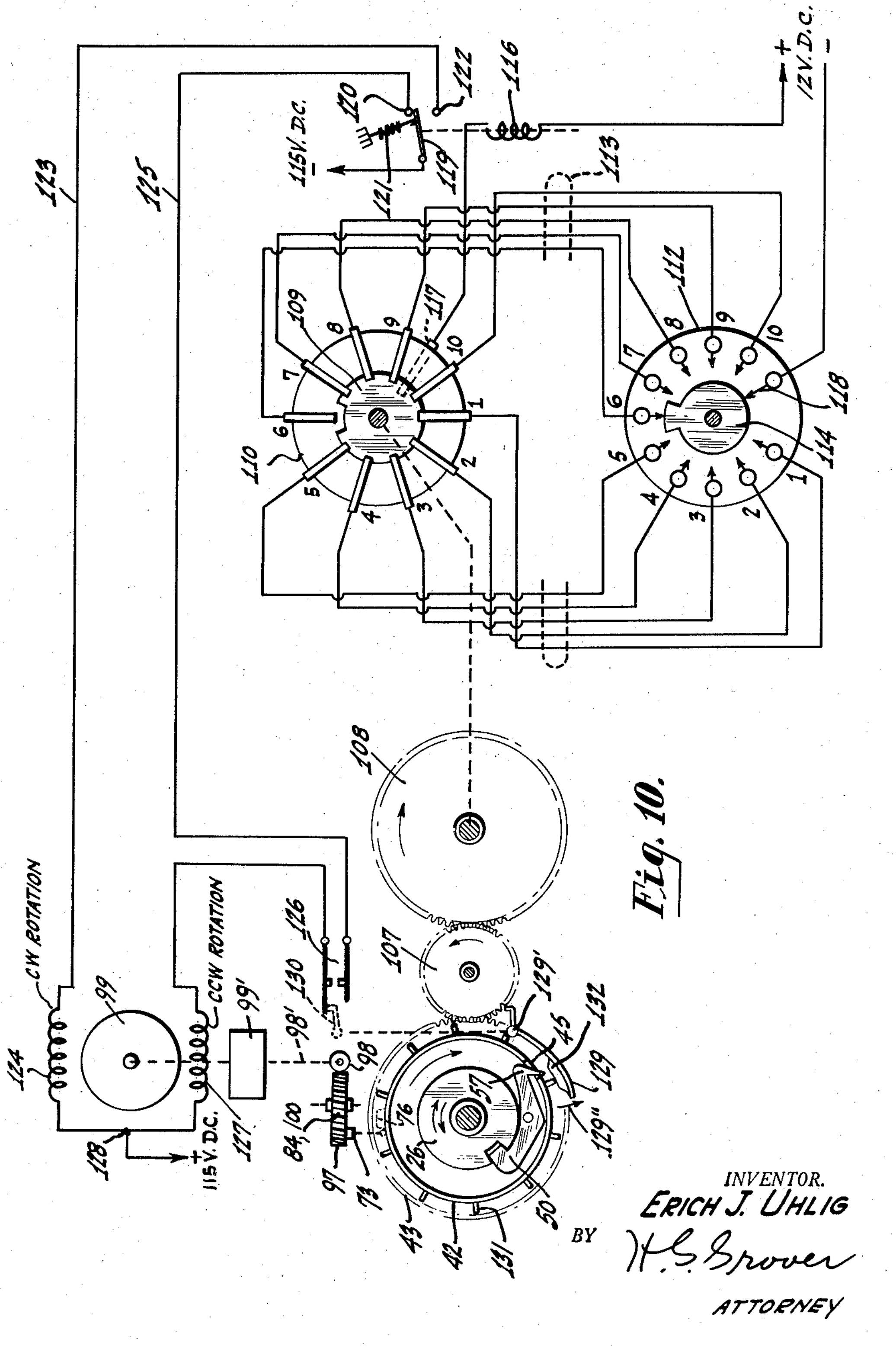
Fig. 10 is a schematic diagram of the electrical control system for operating the selector mechanism.

The electrical control system for operating in proper sequence the selector mechanism above described is shown schematically in Fig. 10. In this figure only certain of the parts of the selector mechanism are shown, and they are designated by the same reference numerals as in the more detailed showings in the other figures. Drum gear 43 is in mesh with an idler 107 which in turn is meshed with another gear 108 which is adapted to drive the rotor 109 of a homing switch 110. This switch is provided with ten equiangularly spaced contact brushes marked 1 to 10 to correspond to the number of predetermined positions to which the selector unit is settable. The rotor is conductive except for an insulating or cut-out portion 111. The gearing between selector drum 42 and the homing-switch rotor 109 is such that they are phased to rotate in synchronism; that is, as cut-out 111 is successively moved from one brush contact to another, selector drum 42 is rotated through a corresponding angle, and for each setting of the homing-switch rotor there is a corresponding setting for the drum at which a drum slot is aligned with its corresponding stop-lever to permit its tail portion 57 to extend therethrough.

A manually-operable, rotary channel-selector switch 112, which may be located at a remote point, though not necessarily, is provided also with ten contact brushes, numbered 1 to 10, corresponding ones of which are connected to the homing-switch contacts by means of a 10-conductor cable 113. The rotor 114 of manual selector switch 112 is provided with a projection as shown which is adapted to make selective contact with the brush contacts associated therewith.

A motor reversing relay 116 has its winding connected electrically at one end to a brush contact 117 which is in continuous contact with rotor 109 of the homing switch, and the other end of said relay winding is connected to the + side of a suitable source of voltage, designated 12 v. D.-C. The − side of said source is connected electrically to a brush contact 118 which is in continuous contact with the manual rotor 114 of the selector switch. A switch arm 119 under the control of the reversing relay 116 is normally held on its back contact 120 by means of a spring 121 and is actuated to its front contact 122 upon energization of the reversing relay. Front contact 122 is connected through a conductor 123 to the motor field winding 124 which is adapted to operate the driving motor in the clockwise (cw.) direction as seen in Fig. 5. Back contact 120 is connected through a conductor 125 and a limit switch 126 to the motor field winding 127 which is adapted to operate the motor in the counter-clockwise (ccw.) direction. The two field windings have a common terminal 128 which is connected to one side (+) of a source of voltage designated 115 v. D.-C., the other side (−) of said source being connected to the switch arm 119.

The opening of limit switch 126 terminates a cycle of operation which is commenced with the setting of selector switch arm 114 to a desired position. The limit switch is otherwise closed during operation of the selector mechanism in the counterclockwise direction. The means for actuating the limit switch to open position may consist of an arcuate arm or plate 129 pivoted at 129′ and normally spring-pressed toward the drum. An arm 130 is attached to plate 129 and is adapted to swing therewith, such an arm 130 being shown duplicated in Fig. 10 for greater simplicity of circuit diagram. Affixed to the periphery of drum 42 are a plurality of pins 131, one for each of the drum slots 45, the pins being disposed slightly in advance of their respective slots in the direction of drum rotation and, assuming the selector switch arm 114 has been set to bring a particular slot 45 into operation, sufficiently in advance of the slot to move out of engagement with plate 129 before drum 42 stops at that position with the end of lever arm 50 projecting through it. During the ensuing slight backward travel of the drum, as explained above, to force the then-operative lever to its locked-in position, the pin 131 coacts with the contact portion 132 of arcuate plate 129 urging the plate in the direction of arrow 129″ to rock the arm 130 upwardly to open the limit switch. This, then, is the condition of the selector mechanism at the termination of a cycle of operation which, as shown by the setting of the selector switch 112 in Fig. 10, is for the predetermined position of adjustment of control shaft 12 (as well as of device 18′) corresponding to channel No. 6.

Let it be assumed now that it is desired to adjust variable tuning condenser 18′ to a setting corresponding to channel No. 9. Rotor 114 of the manual selector switch is then rotated to contact brush 9. This completes a circuit from the − side of the 12 v. source, to brush contact 118, rotor 114 on contact 9, through the cable conductor to contact 9 of the homing switch, rotor 109, brush contact 117, the winding of the reversing relay 116, and back to the + side of said source. As a result, the reversing relay is energized to actuate switch 119 to its front contact 122. This closes a circuit from the − side of the 115 v. source, through switch 119 on front contact 122, conductor 123, and the cw. field winding 124 to the + side of the 115 v. source. The motor is now energized to rotate in the clockwise direction, Figs. 5 and 8, and through the gear train represented by block 99′, the worm gear 98 is actuated to drive the clutch part 94 also in the clockwise direction.

Depending upon the position of pin 103 in slot 104, motion of clutch part 94 will not be transmitted to the ring member 100 until the pin coacts with slot edge 106. When this lost-motion is taken up, the pin 103 will commence rotating ring 100, and the driving stud 73 carried thereby will also travel in the clockwise direction, Fig. 5 and counter-clockwise, Fig. 6, (arrow 74) towards edge 75 of the slip cam 62.

Until stud 73 reaches edge 75 (Fig. 6), drum 42 remains locked in the position in which it was set during the previous cycle. In the case assumed above it would be the setting for channel No. 6. During this portion of the cycle thus far described, the control shaft 12 is also locked against rotation by reason of the locked engagement between disc assembly 20 and the No. 6 stop-lever 50 still retained in its operative position. Since control shaft 12 is thus caused to remain stationary, the inner clutch part 84 which is keyed to the shaft remains stationary also, but the outer clutch part 94, which is being rotated by motor-driven worm gear 98, is capable of being moved around the inner clutch part. This slipping action of the clutch is due to the fact that the friction, normally existing between race-way 95 and balls 93 and accentuated by the force exerted by springs 90, is overcome by the torque of the moving clutch part 94.

With driving stud 73 now in contact with edge 75 (Fig. 6), rotation of the slip cam and drum in the clockwise direction is begun. It will now be seen from Fig. 5 that as the drum is rotated in the clockwise direction (arrow 61) edge 82 of the slot backs away from the tail edge 83 thus unlocking the stop-lever at this end. As the other edge 32 of the slot coacts with tail portion 57 it applies a force thereto sufficient to rock the lever about its pivot 51 and to thus disengage part 56 from the disc notch 27. Movement of the drum forces the stop-lever thus disengaged to assume the position shown for lever 50′. Since the disc assembly and control shaft are now free to rotate, they will be rotated in the same direction as the drum by the inner clutch part 84 which is no longer held stationary by any restraining force.

It should be noted at this time that upon withdrawal of the stop-lever tail portion into the drum, pin 131 is moved away from plate 129, and limit switch 126 is caused to close. In this portion of the cycle of operation, opening and closing of switch 126 has no effect, however, on the motor drive (which is in the clockwise direction) since switch 119 is held on its front contact 122 by the energized relay 116.

With the commencement of rotation of drum 42, rotor 109 of the homing switch is rotated in synchronism therewith, as previously explained, until cut-out portion 111 arrives opposite brush contact 9. At this position of the rotor, the reversing relay circuit is broken at contact 9, permitting switch 119 to fall back on its back contact 120, and thus closing the motor circuit through the ccw. field winding 127, limit switch 126 being then closed for reasons mentioned above. At the termination of the motor operation in the clockwise direction, the drum will have been rotated to a position corresponding to that of the homing-switch rotor, so that the No. 9 stop-lever has its tail portion 57 in registry with the drum slot 45 aligned therewith. The stop-lever tail portion will not be expelled through said slot to its fullest extent unless the locking portion 56 registers with the disc notch 27 of the aligned selector disc. Normally, however, the lever portion 56 will be forced against the periphery of the selector disc.

The second half of the cycle of operation commences with the motor operating in the reverse or counter-clockwise direction which occurs, as mentioned above, when switch 119 returns to its back contact 120, relay 116 having been deenergized. The motor circuit now is closed from the — side of the 115 v. source, through switch 119 closed on contact 120, conductor 125, limit switch 126 now in the closed position, the ccw. field winding 127, and back to the + side of the 115 v. source.

As explained in connection with Fig. 7, in the reverse direction of motor operation, the driving stud 73 backs away from the edge 75 of the slip cam and continues in the direction of arrow 77 toward edge 78 on the other side of cam projection 76. Simultaneously, the clutch is operative to drive control shaft 12 and disc assembly 20 in the same or counter-clockwise direction until the notch 27 in the No. 9 selector disc is engaged by the locking portion 56 of the No. 9 stop-lever, at which time the clutch will begin to slip as in the first half cycle, and the lever is rocked about its pivot 51 by action of its spring 58 to force the tail portion 57 still further through the drum slot 45. At this time the side 83 of tail 57 is spaced from the forward edge 82 of the slot a distance of approximately $\frac{1}{16}$ of an inch. Shortly after the selector disc is locked in position, as mentioned above, the driving stud 73 approaches the other side of cam projection 76, and then rides up incline 78 and onto top edge 79 to bring about the slight backward travel of the drum to thereby lock the stop-lever securely in position as previously explained in connection with Figs. 6 and 7, and to cause the drum pin 131 to rock arcuate plate 129 in the direction of arrow 129''. This causes the opening of limit switch 126 which in turn breaks the motor circuit and stops operation of the motor, thus completing the cycle of operation.

In order that the desired synchronism between the drum and the homing switch may be maintained in spite of the slight backward travel of the drum which is utilized to effect locking of an operative stop-lever, there is provided, between the rotor 109 of the homing switch and its operating shaft on which the gear 108 is also mounted, a lost-motion connection (not shown) which permits said shaft to rock through a corresponding angle in the reverse direction without disturbing the position of the rotor.

In some instances, it may be necessary to set-up the selector so that the disc notches 27 of certain of the discs are angularly spaced apart only in a slight degree. This would arise where the operating channels of the equipment are closely spaced. In order to meet this contingency, the previously described lost-motion connection (pin 103 and slot 104) between the clutch and the driving stud is provided. This connection permits the selector disc assembly to rotate in the reverse direction through a substantial part of a revolution, in addition to the excursion of stud 73 in rotating from engagement with the edge 75 of cam projection 76 into engagement with the edges 78 and 79, thereby assuring that the notch 27 of the selector disc made operative by the position in which drum 42 is stopped by the homing switch, will be brought into engagement with its corresponding stop lever 50 before the limit switch is opened.

Figure 7:
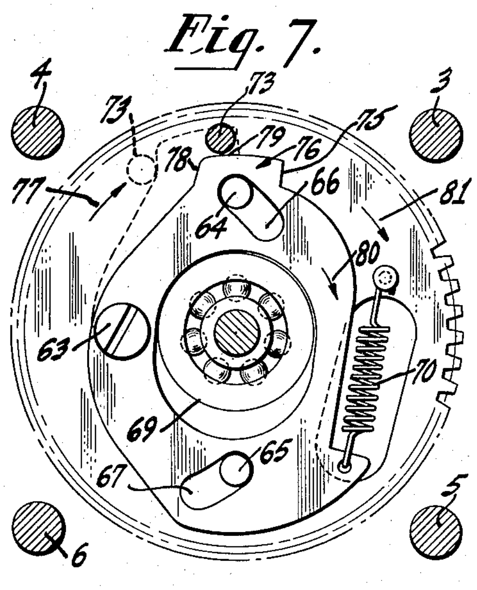
Fig. 7 is a cross-sectional view, similar to Fig. 6, showing the slip cam actuated in the opposite direction for the purpose of backing up the drum to its lever holding position shown in Fig. 5.

The lost-motion connection 103, 104 between worm wheel 97 and the ring 100 also performs a useful function in the movement of stud 73 over the edge 79 of cam projection 76, Fig. 7, to the right-hand side, as seen in Fig. 6. As stud 73 passes off the point of the cam projection spring 70 snaps slip cam 62 back to the position seen in Fig. 6. This produces a reaction between stud 73 and slip cam 62, which in the present structure merely throws the ring 100 and stud 73 in some degree clockwise on bearing 102. This produces substantially zero reaction tending to move the drum 42. If stud 73 were fixedly connected to worm wheel 97, its movement off the point of cam projection 76 would create a relatively strong reaction in a direction tending to move drum 42 out of proper locking engagement with the tail portion 83 of lever 50, thereby also tending improperly to close the limit switch.

A multiplicity of selector units similar to that herein described may be utilized in a single installation. In one case, in a two-way communication system, six such units were employed, four in the transmitter and two in the receiver, the several clutch worm-wheels 97, one for each unit, being driven from a single motor through suitable gearing and counter-shafts. Although the limit-switch-operating means (arcuate plate 129, switch arm 130, pins 131, etc.) may be used in a multiple unit installation, in which case a limit switch 126 would be required for each unit and all connected in parallel, it was found more practical and economical to use a single limit switch operated by a cam (not shown) which, through suitable gearing interposed between the motor drive and the cam, is timed to open the common limit switch after the drums 42 of all the selectors have been set to their respective predetermined angular positions. For simplicity of illustration I have shown the pins 131 only in Fig. 10. It will be apparent to those skilled in the art how to mount the pins 131 on drum 42.

The procedure for initially setting up the several discs or rings 26 of the selector unit is as follows: The multi-position channel selector switch is first set to any desired position, such as, for example, position No. 1. This initiates operation of the mechanism, and upon completion of the cycle as above described, selector disc No. 1 will have been rotated to a position whereat it is locked by its associated stop-lever. With the disc so locked, lever 39 at the front of the manual control knob is pulled out to thereby unclamp the disc stacks. The control knob is then manually rotated until the variable element is turned to its desired setting. The discs are then clamped together again by pushing in lever 39 to its first position. Thereafter, for position No. 1 of the control switch, the selector disc assembly will be actuated to the position just set. The same procedure is followed for all of the other positions of the control switch.

By reason of the fact that the selector discs are mounted on the ring bushings 25 with sufficient friction and are unclamped at their peripheral rim portions which are separated by spacers or washers that are locked against rotation, the manual rotation, in the setting-up operation, of all of the discs of the stack except the one that is held in locked position will not cause accidental displacement of any of the other discs that may have been adjusted previously.

While I have shown and described a preferred embodiment of my invention, it will be understood that various modifications and changes will occur to those skilled in the art without departing from the spirit and scope of this invention.

What I claim is:

1. Selector mechanism adapted to effect adjustment of a device to one of a plurality of predetermined positions, comprising a selector disc assembly mechanically coupled to the device to be adjusted, said assembly comprising a plurality of selector discs each fully rotatable with respect to the others of said discs whereby said discs may be positioned at any desired angular position with respect to any other of said discs, a member disposed in spaced concentric relation with the disc assembly selectively actuatable to settings which correspond each to one of said predetermined positions, means positioned between the disc assembly and the concentric member operable, upon actuation of said member to a selected one of its settings, to stop the disc assembly at a position corresponding to said setting, and means for actuating said member and said selector disc assembly in a predetermined sequence of operations.

2. A driven selector mechanism for automatically adjusting a device to one of a plurality of predetermined positions, including a plurality of selector discs one for each of said positions arranged to be clamped together to form a selector disc assembly mechanically coupled to the device to be adjusted, said selector discs being fully rotatable with respect to one another, a member encircling said disc assembly selectively actuatable to settings corresponding to each of said predetermined positions, a plurality of means one for each of said discs arranged between said disc assembly and said encircling member, one of said means being operable upon actuation of said member to a selected one of its settings to stop said disc assembly at a position corresponding to said setting, and drive means for actuating said member and said selector disc assembly in predetermined sequence.

3. A driven selector mechanism for automatically effecting the adjustment of a device to one of a plurality of predetermined positions, including a plurality of selector discs arranged to be clamped together to form a selector disc assembly mechanically coupled to the device to be adjusted, said selector discs being fully rotatable with respect to one another, a rotatable member spaced from and encircling said disc assembly selectively actuatable to settings corresponding to each of said predetermined positions, a plurality of stop levers arranged in the space between said disc assembly and said encircling member, a selected one of said levers depending upon the actuation of said member to one of its settings to stop said disc assembly at a position corresponding to said setting, and drive means for actuating said member and said selector disc assembly in predetermined sequence.

4. A driven selector mechanism for automatically effecting adjustment of a device to one of a plurality of predetermined positions, including a plurality of selector discs each provided with a peripheral notch, the angular position of which determines the adjusted position of the device, said discs arranged to be clamped together to form a selector disc assembly mechanically coupled to the device to be adjusted, said selector discs being fully rotatable with respect to one another, a drum concentrically arranged about and spaced from said disc assembly selectively actuatable to settings corresponding to each of said predetermined positions, a plurality of stop levers corresponding to the number of selector discs positioned in the space between said disc assembly and said drum, a stop element arranged on each lever, lever actuation means arranged on said drum, a stop lever determined by the setting of said drum adapted to coact with said lever actuating means to engage the stop element of the selected lever in said notch of the corresponding selector disc to stop said disc assembly at a position corresponding to said drum setting, and drive means for actuating said member and said selector disc assembly in predetermined sequence.

5. Selector mechanism adapted to effect adjustment of a device to one of a plurality of predetermined positions, comprising a selector disc assembly mechanically coupled to the device to be adjusted, said assembly comprising a plurality of selector discs each having a stop element arranged on the periphery thereof, said discs being fully rotatable with respect to each other whereby said stop elements may be positioned at any desired angular displacement from the stop element of a given disc, a rotatable drum member disposed in spaced concentric relation with the disc assembly selectively adjustable to settings which correspond each to one of said predetermined positions, a plurality of stop-levers positioned in the space between the disc assembly and the drum member adapted to engage said stop element of the disc corresponding to the desired position to stop the disc assembly at a position corresponding to said setting, and means for actuating said drum member and said selector disc assembly in a predetermined sequence of operations.

6. A motor-operated selector mechanism adapted to effect the automatic adjustment of a rotatable device to one of a plurality of predetermined angular positions, comprising a stack of position-determining rings, each corresponding to one of said positions, mechanically coupled as a unit to the device to be adjusted, a drum encircling said rings provided with a plurality of equi-angularly spaced slots selectively actuatable to settings which correspond each to one of said predetermined positions, a plurality of stop-arms, one for each ring, each of said stop arms being individually operable depending upon the drum setting to coact with its associated ring and eventually to stop said ring-stack and the device to be adjusted at the predetermined position corresponding to said drum setting, and drive means for actuating said drum and ring-stack in a predetermined sequence of operations.

7. A driven selector mechanism for automatically adjusting a rotatable device to a predetermined position, including a disc coupled to said rotatable device for rotation therewith, said disc having an abrupt change of periphery at one portion thereof, the angular position of which determines the adjusted position of said device, a rotatable member encircling said disc having an abrupt departure in the periphery at a portion thereof corresponding to said predetermined position, a lever pivotally positioned at a point intermediate the ends thereof between said disc and said member, a cam member having a shoulder on the periphery thereof pivotally mounted on said encircling member to rotate therewith, a drive member arranged to rotate in either direction about the axis of said rotatable member and engaging said cam shoulder to drive said cam and said rotatable member and said disc in one direction to the setting corresponding to said predetermined position, one end of said lever engaging the abrupt departure of periphery of said rotatable member at said setting, said drive member rotating said disc in the opposite direction to engage the other end of said lever with the abrupt change of periphery of said disc and engaging said cam shoulder in the opposite direction of travel to rock said cam about the pivotal mounting thereof and impart slight movement of said rotatable member in said one direction to lock said lever in engagement with said rotatable member and to fix the position of said disc accurately at said predetermined position, thereby to position said rotatable device accurately.

8. A motor-operated selector mechanism adapted to effect the automatic adjustment of a device to one of a plurality of predetermined positions, comprising a selector disc assembly mechanically coupled to the device to be adjusted, said assembly consisting of a plurality of axially-spaced discs each provided with a peripheral notch, the angular position of which determines the adjusted position of the device, a drum aranged in concentric relation with and spaced from the disc assembly provided with a plurality of slots, one for each selector disc, said slots being aligned each with its corresponding disc and also equiangularly spaced so that the several slots are arranged in a spiral formation, said drum being actuatable to angular settings which correspond each to one of said predetermined positions, a plurality of axially-spaced, pivoted stop-levers, one for each selector disc, positioned in the space between the disc assembly and the drum, each stop-lever being aligned with its corresponding disc and drum slot and provided at one end with a stop portion and at its other end with a tail portion which is adapted to extend through the drum slot aligned therewith, a selected one of the stop-levers depending upon the setting of the drum adapted to swing about its pivot by reason of the tail portion of the lever entering the drum slot to permit thereby its stop portion to engage the notch of the responding selector disc for stopping the disc assembly at a position corresponding to said drum setting, and drive means for actuating said drum and said selector disc assembly in a predetermined sequence of operations.

9. Selector mechanism for automatically adjusting a control shaft to one of a plurality of predetermined angular positions, comprising a framework provided with front and rear end plates, the control shaft to be adjusted extending through and journalled within said end plates, a plurality of individually adjustable position-determining members mounted on said shaft between said end plates, a multi-position rotatable drum arranged in concentric relation with and spaced from said members, a plurality of stopping means, individually operable in dependence upon the drum position, supported from the front plate and disposed within the space between said members and the drum, and drive means for actuating, in a predetermined sequence of operations, said drum to a selected one of its positions and said members to a corresponding position whereat it is stopped by the then effective stopping means.

10. Selector mechanism for automatically adjusting a control shaft to one of a plurality of predetermined angular positions, comprising a framework provided with front and rear end plates, the control shaft to be adjusted extending through and journalled within said end plates, a selector disc assembly having individually adjustable discs mounted on said shaft between said end plates, a multi-position rotatable drum arranged in concentric relation with and spaced from the disc assembly, a plurality of disc stopping means, individually operable in dependence upon the drum position, supported from the front plate and disposed within the space between the disc assembly and the drum, and drive means for actuating, in a predetermined sequence of operations, said drum to a selected one of its positions and said selector disc assembly to a corresponding position whereat it is stopped by the then effective disc stopping means.

11. Selector mechanism for automatically adjusting a control shaft to one of a plurality of predetermined angular positions, comprising a framework provided with front and rear end plates, the control shaft to be adjusted extending through and journalled within said end plates, a selector disc assembly having individually adjustable discs mounted on said shaft between said end plates, a multi-position rotatable drum arranged in concentric relation with and spaced from the disc assembly, a plurality of disc stopping means, individually operable in dependence upon the drum position, supported from the front plate and disposed within the space between the disc assembly and the drum, a reversible motor, means operable upon rotation of the motor in one direction to drive the drum to a selected one of its positions, and means operable upon rotation of the motor in the opposite direction to drive the selector disc assembly to a position whereat it is stopped by the then effective disc stopping means.

12. Selector mechanism for automatically adjusting a control shaft to one of a plurality of predetermined angular positions, comprising a selector disc assembly constituted by a stack of individually adjustable discs mounted on said shaft, a multi-position rotatable drum arranged in concentric relation with and spaced from the disc assembly, a plurality of disc stopping means, individually operable in dependence upon the drum position, disposed within the space between the disc assembly and the drum, a reversible motor, means including a clutch device interposed between said motor and control shaft operable upon rotation of the motor in one direction to drive the drum to a selected one of its positions, and means including said clutch device operable upon rotation of the motor in the opposite direction to drive the selector disc assembly to a position whereat it is stopped by the then effective disc stopping means.

13. Selector mechanism for automatically adjusting a control shaft to one of a plurality of predetermined angular positions, comprising a selector disc assembly constituted by a stack of individually adjustable discs mounted on said shaft, a multi-position rotatable drum arranged in concentric relation with and spaced from the disc assembly, uni-directional driving means for the drum disposed at one end of the disc assembly, a plurality of disc stopping means, individually operable in dependence upon the drum position, disposed within the space between the disc assembly and the drum, a clutch device having a hub portion keyed to the control shaft and an outer annular portion in the form of a gear, and a reversible motor geared to said clutch gear operable upon rotation in one direction to drive the drum through said clutch and said uni-directional driving means to a selected one of its positions and operable upon rotation in the opposite direction to drive the selector disc assembly through said clutch to a position whereat it is stopped by the then effective disc stopping means.

14. Selector mechanism for automatically adjusting a control shaft to one of a plurality of predetermined angular positions, comprising a selector disc assembly constituted by a stack of individually adjustable discs mounted on said shaft, a multi-position rotatable drum arranged in concentric relation with and spaced from the disc assembly, means for rotatably supporting said drum including a plate attached to one end of the drum and journalled on the control shaft, uni-directional driving means for the drum constituted by a pivoted member carried by the drum end plate and a driving pin, said pivoted member being provided with a shoulder with which the driving pin is adapted to coact, a plurality of disc stopping means individually operable in dependence upon the drum position, disposed within the space between the disc assembly and the drum, a clutch having a hub portion keyed to the control shaft and an outer annular portion in the form of a gear, means including a lost motion connection for actuating the driving pin from the clutch gear, and a reversible motor geared to said clutch gear operable upon rotation in one direction to cause the drum, after take up of the lost motion connection, to be driven through said clutch and said uni-directional driving means to a selected one of its positions and operable upon rotation in the opposite direction to cause the selector disc assembly, after take up of the lost motion connection, to be driven through said clutch to a position whereat it is stopped by the then effective disc stopping means.

15. Selector mechanism for automatically adjusting a control shaft to one of a plurality of predetermined angular positions, comprising a framework provided with front and rear end plates, the control shaft to be adjusted extending through and journalled within said end plates, a selector disc assembly having individually adjustable discs mounted on said shaft between said end plates, a multi-position rotatable drum arranged in concentric relation with and spaced from the disc assembly, a plurality of disc stopping means, individually operable in dependence upon the drum position, supported from the front plate and disposed within the space between the disc assembly and the drum, a reversible motor, means including a clutch device interposed between said motor and control shaft operable upon rotation of the motor in one direction to drive the drum to a selected one of its positions, and means including said clutch device operable upon rotation of the motor in the opposite direction to drive the selector disc assembly to a position whereat it is stopped by the then effective disc stopping means.

16. Selector mechanism for automatically adjusting a control shaft to one of a plurality of predetermined angular positions, comprising a framework provided with front and rear end plates, the control shaft to be adjusted extending through and journalled within said end plates, a selector disc assembly having individually adjustable discs mounted on said shaft between said end plates, a multi-position rotatable drum arranged in concentric relation with and spaced from the disc assembly, uni-directional driving means for the drum interposed between the disc assembly and the rear end plate, a plurality of disc stopping means, individually operable in dependence upon the drum position, supported from the front plate and disposed within the space between the disc assembly and the drum, a clutch device interposed between the drum driving means and the rear end plate, said clutch having a hub portion keyed to the control shaft and an outer annular portion in the form of a gear, and a reversible motor geared to said clutch gear operable upon rotation in one direction to drive the drum through said clutch and uni-directional driving means to a selected one of its positions and operable upon rotation in the opposite direction to drive the selector disc assembly through said clutch to a position whereat it is stopped by the then effective disc stopping means.

17. Selector mechanism for automatically adjusting a control shaft to one of a plurality of predetermined angular positions, comprising a framework provided with front and rear end plates, the control shaft to be adjusted extending through and journalled within said end plates, a selector disc assembly mounted on said shaft between said end plates, said assembly consisting of a plurality of axially-spaced discs each provided with a peripheral notch, the angular position of which determines the position of adjustment of the control shaft, a rotatable drum, arranged in concentric relation with and spaced from the disc assembly, provided with a plurality of slots, one for each selector disc, said slots being aligned each with its corresponding disc and also equi-angularly spaced so that the several slots are arranged in a spiral formation, uni-directional driving means for the drum interposed between the disc assembly and the rear end plate, said drum being actuatable to angular settings which correspond each to one of said predetermined positions, a plurality of axially-spaced, pivoted stop levers, one for each selector disc, supported from the front plate and positioned in the space between the disc assembly and the drum, each stop lever being aligned with its corresponding disc and drum slot and provided at one end with a stop portion and at its other end with a tail portion adapted to extend through the drum slot aligned therewith, a selected one of the stop levers depending upon the setting of the drum adapted to swing about its pivot by reason of the tail portion of the lever entering the drum slot to permit thereby its stop portion to engage the notch of the corresponding selector disc for stopping the disc assembly at a position corresponding to said drum setting, means carried by the drum for imparting slight rotation of the drum in the reverse direction to cause the then effective lever to be locked in position, a clutch device interposed between the drum driving means and the rear end plate, said clutch having a hub portion keyed to the control shaft and an outer annular portion in the form of a gear, and a reversible motor geared to said clutch gear operable upon rotation in one direction to drive the drum through said clutch and uni-directional driving means to a selected one of its positions and operable upon rotation in the opposite direction to drive the selector disc assembly through said clutch to a position whereat it is stopped by the then effective disc stopping means.

18. A driven selector mechanism for automatically adjusting a rotatable device to a predetermined position, including a disc coupled to said rotatable device for rotation therewith, said disc having a notch in the periphery thereof, the angular position of which determines the adjusted position of said device, a rotatable member encircling said disc and having a slot in the periphery thereof at a setting corresponding to said predetermined position, a lever pivotally positioned at a point intermediate the ends thereof between said disc and said member, a cam member having a shoulder on the periphery thereof pivotally mounted on said encircling member to rotate therewith and for limited pivotal movement, a drive member arranged to rotate in either direction about the axis of said rotatable member and engaging said cam shoulder to drive said cam and said rotatable member and said disc in one direction to the setting corresponding to said predetermined position, one end of said lever engaging the slot of said rotatable member at said setting, said drive member rotating said disc in the opposite direction to engage the other end of said lever with the notch of said disc and engaging said cam shoulder in the opposite direction of travel to rock said cam about the pivotal mounting thereof and impart slight movement of said rotatable member in said one direction to lock said lever in engagement with said rotatable member to fix the position of said disc accurately at said predetermined position, thereby to position said rotatable device accurately.

19. A driven selector mechanism for automatically adjusting a rotatable device to a plurality of predetermined positions, including a plurality of discs coupled to said rotatable device for rotation therewith, said discs having notches in the periphery thereof, the angular position of which determines the adjusted positions of said device, a rotatable drum encircling said disc having a plurality of slots in the periphery thereof at settings corresponding to said predetermined positions, a plurality of levers pivotally positioned at a point intermediate the ends thereof between said disc and said member, each of said levers having one hooked end, a cam member having a shoulder on the periphery thereof pivotally mounted on said drum to rotate therewith and for limited pivotal movement, a drive member arranged to rotate in either direction about the axis of said rotatable member and engaging said cam shoulder to drive said cam and said rotatable drum and said disc in one direction to the setting corresponding to said predetermined position, said one end of one of said levers corresponding to said setting engaging the slot of said rotatable drum at said setting, said drive member rotating said disc in the opposite direction to engage the other end of said lever with the notch of the corresponding disc and engaging said cam shoulder in the opposite direction of travel to rock said cam about the pivotal mounting thereof and impart slight movement of said rotatable drum in said one direction to lock the hook of said one lever in the slot of said rotatable drum to fix the position of said one disc accurately at said predetermined position, thereby to position said rotatable device accurately at the corresponding position.

ERICH J. UHLIG.

REFERENCES CITED

The following references are of record in the file of this patent:

UNITED STATES PATENTS

| Number | Name | Date |
|---|---|---|
| Re. 22,574 | Collins | Dec. 5, 1944 |
| 2,216,272 | Kaye | Oct. 1, 1940 |
| 2,320,808 | Van Lammeren et al. | June 1, 1943 |
| 2,391,470 | May | Dec. 25, 1945 |